United States Patent
Dymetman et al.

(10) Patent No.: US 9,552,355 B2
(45) Date of Patent: Jan. 24, 2017

(54) DYNAMIC BI-PHRASES FOR STATISTICAL MACHINE TRANSLATION

(75) Inventors: Marc Dymetman, Grenoble (FR); Wilker Ferreira Aziz, São Paulo (BR); Nicola Cancedda, Grenoble (FR); Jean-Marc Coursimault, Revel (FR); Vassilina Nikoulina, Grenoble (FR); Lucia Specia, Wolverhampton (GB)

(73) Assignee: XEROX CORPORATION, Norwalk, CT (US)

( * ) Notice: Subject to any disclaimer, the term of this patent is extended or adjusted under 35 U.S.C. 154(b) by 698 days.

(21) Appl. No.: 12/784,040

(22) Filed: May 20, 2010

(65) Prior Publication Data

US 2011/0288852 A1     Nov. 24, 2011

(51) Int. Cl.
G06F 17/28     (2006.01)

(52) U.S. Cl.
CPC ....... *G06F 17/2827* (2013.01); *G06F 17/2818* (2013.01)

(58) Field of Classification Search
CPC .............................. G06F 17/28; G06F 17/2818
USPC ................................................. 704/2, 4, 5, 9
See application file for complete search history.

(56) References Cited

U.S. PATENT DOCUMENTS

| | | | |
|---|---|---|---|
| 5,805,832 A * | 9/1998 | Brown et al. ..................... | 711/1 |
| 5,960,382 A * | 9/1999 | Steiner .............................. | 704/2 |
| 6,182,026 B1 | 1/2001 | Tillmann et al. | |
| 6,345,243 B1 * | 2/2002 | Clark .................. | G06F 17/2836 704/2 |
| 6,345,244 B1 * | 2/2002 | Clark .................. | G06F 17/2836 704/2 |
| 6,466,900 B1 * | 10/2002 | Lissauer et al. .................. | 704/7 |
| 6,556,972 B1 * | 4/2003 | Bakis et al. ................. | 704/277 |
| 6,917,936 B2 | 7/2005 | Cancedda | |
| 7,672,852 B2 * | 3/2010 | Millett et al. ................ | 704/277 |

(Continued)

OTHER PUBLICATIONS

Huang et al. "Hierarchical system combination for machine translation". In Proceedings of the 2007 Joint Conference on Empirical Methods in Natural Language Processing and Computational Natural Language Learning (EMNLP-CoNLL), Jun. 2007, pp. 277-286.*

(Continued)

*Primary Examiner* — James Wozniak
(74) *Attorney, Agent, or Firm* — Fay Sharpe LLP

(57) ABSTRACT

A system and a method for phrase-based translation are disclosed. The method includes receiving source language text to be translated into target language text. One or more dynamic bi-phrases are generated, based on the source text and the application of one or more rules, which may be based on user descriptions. A dynamic feature value is associated with each of the dynamic bi-phrases. For a sentence of the source text, static bi-phrases are retrieved from a bi-phrase table, each of the static bi-phrases being associated with one or more values of static features. Any of the dynamic bi-phrases which each cover at least one word of the source text are also retrieved, which together form a set of active bi-phrases. Translation hypotheses are generated using active bi-phrases from the set and scored with a translation scoring model which takes into account the static and dynamic feature values of the bi-phrases used in the respective hypothesis. A translation, based on the hypothesis scores, is then output.

25 Claims, 4 Drawing Sheets

(56) References Cited

U.S. PATENT DOCUMENTS

| | | | |
|---|---|---|---|
| 7,707,024 B2* | 4/2010 | Arayasantiparb et al. | 704/5 |
| 7,716,039 B1* | 5/2010 | Bangalore et al. | 704/9 |
| 8,244,519 B2* | 8/2012 | Bicici et al. | 704/2 |
| 2003/0154068 A1* | 8/2003 | Tokuda et al. | 704/7 |
| 2004/0024581 A1 | 2/2004 | Koehn et al. | |
| 2004/0030551 A1 | 2/2004 | Marcu et al. | |
| 2005/0131673 A1* | 6/2005 | Koizumi et al. | 704/2 |
| 2005/0137854 A1 | 6/2005 | Cancedda et al. | |
| 2005/0216256 A1* | 9/2005 | Lueck | 704/10 |
| 2006/0190241 A1 | 8/2006 | Goutte et al. | |
| 2007/0150257 A1* | 6/2007 | Cancedda et al. | 704/2 |
| 2007/0265825 A1* | 11/2007 | Cancedda et al. | 704/2 |
| 2008/0243472 A1* | 10/2008 | DeGroot et al. | 704/2 |
| 2008/0262826 A1 | 10/2008 | Pacull | |
| 2008/0262827 A1* | 10/2008 | DeGroot | 704/3 |
| 2008/0300857 A1 | 12/2008 | Barbaiani et al. | |
| 2009/0132232 A1* | 5/2009 | Trefler | 704/2 |
| 2009/0175545 A1 | 7/2009 | Cancedda et al. | |
| 2009/0326913 A1* | 12/2009 | Simard et al. | 704/2 |
| 2010/0070521 A1 | 3/2010 | Clinchant et al. | |
| 2010/0125446 A1* | 5/2010 | Wathen | 704/2 |

OTHER PUBLICATIONS

Habash. "Four techniques for online handling of out-of-vocabulary words in Arabic-English statistical machine translation". In Proceedings of the 46th Annual Meeting of the Association for Computational Linguistics on Human Language Technologies: Short Papers (HLT-Short '08). Association for Computational Linguistics,2008, Stroudsburg, PA, 57-60.*

Cattoni et al. "A web-based demonstrator of a multi-lingual phrase-based translation system". In Proceedings of the Eleventh Conference of the European Chapter of the Association for Computational Linguistics: Demonstrations (EACL '06). Association for Computational Linguistics, 2006, Stroudsburg, PA, pp. 91-94.*

U.S. Appl. No. 12/690,504, Stymne, et al.

U.S. Appl. No. 12/427,149, Dymetman, et al.

Biçici, et al. "Dynamic Translation Memory: Using Statistical Machine Translation to Improve Translation Memory Fuzzy Matches," *Cicling*, pp. 454-465 (2008).

Simard, et al. "Translating with Non-contiguous Phrases," *HLT/EMNLP* (2005).

Carpuat, et al. "Context-Dependent Phrasal Translation Lexicons for Statistical Machine Translation," *Machine Translation Summit XI*. Copenhagen (2007).

Mirkin, et al. "Source-Language Entailment Modeling for Translating Unknown Terms," *ACL-IJNLP* (2009).

Clinchant, et al. "Lexical entailment for information retrieval," European Conference on Information Retrieval, London, UK, 10-12 (Apr. 2006).

Koehn, et al. "Factored Translation Models," *EMNLP-CoNNL*, (2007).

Lopez, A. "Statistical Machine Translation," *ACM Comput. Surv.*, 40 (3), pp. 1-49, (2008).

Yahyaei, et al. "Decoding by dynamic chunking for statistical machine translation," *MT Summit XII: Proceedings of the 12th Machine Translation Summit* (2009).

Chiang, et al The Hiero Machine Translation System: Extensions, Evaluations, and Analysis, *Proceedings of Human Language Technology Conference and Conference on Empirical Methods in Natural Language Processing (HLT/EMNLP)*, pp. 779-786, Oct. 2005.

\* cited by examiner

DYNAMIC BI-PHRASES FOR STATISTICAL MACHINE TRANSLATION

BACKGROUND

The present exemplary embodiment is directed to the field of machine translation. It finds particular application in connection with the use of dynamic bi-phrases in phrase-based statistical machine translation systems.

Phrase-based statistical machine translation (SMT) systems employ a bi-phrase table or "dictionary" as a central resource. This is a probabilistic dictionary associating short sequences of words in two languages. The bi-phrase table is automatically extracted, at training time, from a large bilingual corpus of aligned source and target sentences. When translating from a source to a target language, the bi-phrase table is accessed to retrieve a set of bi-phrases, each of which includes a target phrase which matches part of a source sentence or other text string to be decoded. The retrieved bi-phrases are input to a scoring model, which outputs an optimal translation of the source sentence using a subset of the retrieved bi-phrases. Typically, the scoring model attempts to maximize a log-linear combination of features associated with the bi-phrases entering the combination.

Currently, phrase-based SMT systems rely on a bi-phrase table that is static, that is, is computed once at training time together with associated feature values to be used by the scoring model. A decoder uses a subset of the bi-phrases to generate a translation of an input source sentence into a target sentence. For example, at decoding time, the decoder is initialized with a sub-table of this static table consisting of those bi-phrases that are relevant for the translation of the specific source sentence. The static system poses a problem for translation of sentences which include words which appear infrequently in the training corpus, or not at all. Often, these are handled by substituting the word with a placeholder and replacing this with the untranslated word in the translated target sentence. It also poses a problem where different systems of units are concerned. For example, while in France, prices for liquid volumes may be expressed as Euros or cents per liter, in the US, prices may be expressed in dollars per US pint or US gallon. Readers of the translation thus have difficulty in placing the information in context. There are other instances where it would be advantageous to create a bi-phrase at translation time which differs from those in the static bi-phrase table.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; and U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.

Methods for building libraries of parallel corpora from which bilingual dictionaries can be generated are disclosed, for example, in U.S. Pub No. 2008/0262826, published Oct. 23, 2008, entitled METHOD FOR BUILDING PARALLEL CORPORA, by Francois Pacull. Methods for filtering bi-phrases are disclosed in U.S. patent application Ser. No. 12/427,149, filed on Apr. 21, 2009, entitled BI-PHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 20090175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

Biçici, E., & Dymetman, M. Dynamic Translation Memory: Using Statistical Machine Translation to Improve Translation Memory Fuzzy Matches. *Cicling*, pp. 454-465 (2008) discloses a translation memory in combination with the Matrax™ phrase-based SMT system of Simard, et al. (Simard, M., Cancedda, N., Cavestro, B., Dymetman, M., Gaussier, É., Goutte, C., et al. Translating with Non-contiguous Phrases. *HLT/EMNLP* (2005)). At decoding time, a close translation Memory™ match S' to a given source sentence S ("fuzzy match") is sought. Then, a gapped bi-phrase $(\tilde{s}, \tilde{t})$ from the bilingual entry (S',T') in the TM corresponding to S', with $\tilde{s}$ being the intersection between S and S' is extracted. Then, the new bi-phrase $(\tilde{s}, \tilde{t})$ is added to the static bi-phrases relevant to the translation of S. The bi-phrase $(\tilde{s}, \tilde{t})$ does not have any dynamic features associated with it, but rather, its standard static features are artificially given values that guarantee that it will be favored in the competition with the other bi-phrases during decoding.

BRIEF DESCRIPTION

In accordance with one aspect of the exemplary embodiment, a method for phrase-based translation includes receiving source text in a source language to be translated into target text in a target language. The method includes providing at least one dynamic bi-phrase rule to be used in generation of dynamic bi-phrases for translation of the source text. For a sentence of the source text, the method includes applying the at least one rule to the source text to generate a dynamic bi-phrase. A value of at least one dynamic feature is associated with the at least one dynamic bi-phrase. For a sentence of the source text, the method includes retrieving static bi-phrases from a static bi-phrase table stored in memory, each of the static bi-phrases being associated with a value of at least one static feature, retrieving any of the dynamic bi-phrases which each cover at least one word of the source text, the retrieved static bi-phrases and dynamic bi-phrases forming a set of active bi-phrases, and generating translation hypotheses for at least a part of the source sentence using active bi-phrases from the set, and scoring the translation hypotheses with a translation scoring model which takes into account the static feature values of static bi-phrases in the hypothesis and dynamic feature values of dynamic-bi-phrases in the hypothesis. A translation of the source text sentence based on the scoring of the hypotheses, is output.

In accordance with another aspect, a system for phrase-based translation includes memory which receives source text in a source language to be translated into target text in a target language. A static bi-phrase table is stored in memory, each of the static bi-phrases in the table being associated with at least one static feature value. A dynamic bi-phrase generator associates at least one dynamic feature value with at least one dynamic bi-phrase which has been selected for use in translation of the source text. A translation scoring model is input with hypotheses built from an active set of bi-phrases and scores the hypotheses. The model takes into account the static feature values of static bi-phrases in the hypothesis and dynamic feature values of any dynamic-bi-phrases in the hypothesis.

In another aspect, a method for phrase-based translation includes providing a static bi-phrase table, each of the static bi-phrases in the table being associated with a value of at least one static feature based on a frequency of the static bi-phrase in a training corpus of bisentences. Source text in a source language to be translated into target text in a target language is received. After providing the static bi-phrase table, for a sentence of the source text, the method includes applying at least rule which, when fired, generates at least one respective dynamic bi-phrase based on the source text in the sentence, associating a respective value of at least one dynamic feature with the at least one dynamic bi-phrase, retrieving static bi-phrases from the static bi-phrase table which each cover at least one word of the source text, combining the retrieved static bi-phrases and any generated dynamic bi-phrases to form a set of active bi-phrases, generating translation hypotheses for at least a part of the source sentence using active bi-phrases from the set, scoring the translation hypotheses with a translation scoring model which takes into account the static feature values of static bi-phrases in the hypothesis and dynamic feature values of dynamic-bi-phrases in the hypothesis, and outputting a translation of the source text sentence based on the scoring of the hypotheses.

DETAILED DESCRIPTION

Figure 1:
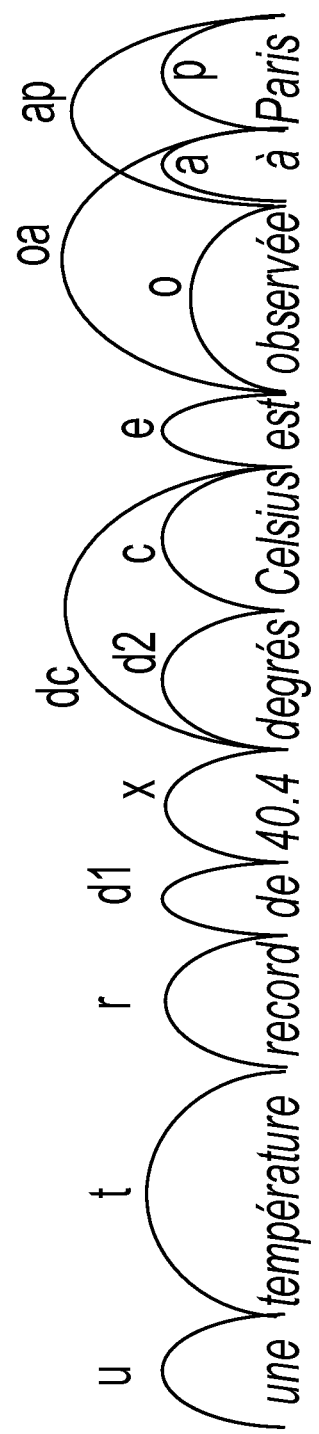
FIG. 1 is a graphical representation of a set of active static bi-phrases for a given source sentence.

A system and method for phrase-based statistical machine translation (PB-SMT) are disclosed which avoid limiting decoding to the use of bi-phrases that are statically defined in the bi-phrase table. Instead the decoding utilizes dynamic bi-phrases which are defined after the generation of the static bi-phrase table, e.g., at run-time, on the basis of the given source sentence. Features are associated with the dynamic bi-phrase which allow it to compete with other (e.g., static) bi-phrases during scoring, without requiring that it will be favored over static bi-phrases. This adds considerable flexibility to PB-SMT systems. Most of the decoding and training mechanisms that already exist for standard PB-SMT systems can be utilized by the system with minimal modifications.

The system and method find application in the automated translation of text from a first natural language (the source language) to text in a second natural language (the target language). The system and method have a number of specific applications, including handling of Out-Of-Vocabulary (OOV) words through source-level paraphrase/entailment, introduction of local translation rules, rule-based/SMT hybridization, and contextual priming for translation via paraphrasing/entailment, which are described in further detail below. It is to be appreciated that the system and method may have other applications and that they are not restricted to those exemplified herein. In various aspects, a generic framework for adding dynamic-bi-phrases to a PB-SMT system is provided. In other aspects, a methodology for associating features with the dynamic bi-phrases and for training them is provided.

A "static bi-phase," as used herein, is a pair of phrases (each phrase comprising a sequence of one or more words), one phrase from the source language and the other from the target language, which an automated system used for extracting bi-phrases has output as a translation of each other in at least the source language to target language direction. A static bi-phrase is thus one which has been observed in a training corpus of bi-sentences and which has one or more associated feature values determined on the basis of the training corpus. These feature values are thus independent of the sentence to be translated (i.e., the features derived from the training corpus have static values). While in general, bi-phrases include contiguous sequences of words, in some cases, bi-phrases with gaps are generated, with some control on the permitted gap size, such as: "ne ◊ jamais"↔"never", where ◊ represents a gap of one or more words.

A static bi-phrase table includes static bi-phrases extracted from a training corpus of parallel sentences, together with the computed values of one or more such features, such as a measure of their frequency of occurrence in the training corpus. The static bi-phrase table need not be stored in the form of a table but can be stored in computer memory in any suitable accessible data structure. The same static bi-phrase table is then accessed for all translations of text between the source and target languages.

A "dynamic bi-phrase," as used herein, is a pair of phrases (each phrase comprising a sequence of one or more words), one phrase from the source language and the other from the target language, which is dynamically constructed when a new source sentence is proposed for translation. An active set of bi-phrases, which may include one or more constructed dynamic bi-phrases, is used to initialize the decoding process. A dynamic bi-phase may be input by a user directly, generated from a pattern input by a user, or generated from a pattern which is automatically derived from a rule input by a user. In other cases, the decoding system may propose the dynamic bi-phrase based on the construction of a sentence to be translated. Various types of dynamic bi-phrases are proposed herein for handling specific cases for which static bi-phrases may not always provide an optimum translation. Frequently, dynamic bi-phrases are those which, for various reasons, cannot be automatically generated from a training corpus of parallel sentences. Unlike a static bi-phase, a dynamic bi-phrase may have no associated measure of frequency derived for that specific bi-phrase from the training corpus (either because the bi-phrase does not occur in the training corpus or because it occurs with a frequency which is below a predetermined threshold for being added to the bi-phrase table). Dynamic bi-phrases thus have the same form as the static bi-phrase in that they include a source phrase and a target phrase and one or more associated values of respective features. However, none of the features of the dynamic bi-phrases is based on a frequency in the training corpus determined in the same way as those of the static bi-phrases, allowing them to be generated at will, e.g., at translation time.

While the description that follows only gives a sample of possible applications for dynamic bi-phrases, they represent a simple, yet very powerful, paradigm for improving current PB-SMT systems, and, significantly, they liberate the translator from limiting valid bi-phrases to static ones extracted at training time.

In the exemplary embodiment, rather than relying solely on bi-phrases selected from a static table, the system and method allows dynamic construction of bi-phrases, e.g., when a new source sentence has been proposed for translation. The system uses an active table of dynamic bi-phrases just constructed in order to initialize the decoding process.

In the decoding process, an optimal translation is obtaining by scoring a number of features, e.g., by maximizing a log-linear combination of features. New features are proposed for the scoring model which enable the dynamic bi-phrases, which have no associated measure of frequency derived from the training corpus, to be used.

As an example of where the method may be used, consider the following example. Suppose that the following French sentence is to be translated into English:

une température record de 40.4 degrés Celsius est observée à Paris

With a standard PB-SMT system, the following translation may be obtained:

a record temperature of 40.4 degrees Celsius is observed in Paris

To produce such a translation, the PB-SMT system decoder has employed the following "static" table of bi-phrases (where only "active" bi-phrases, that is, bi-phrases relevant to the current source sentence, are shown):

TABLE 1

Static bi-phrase table in a standard PB-SMT system

| STATIC BI-PHRASE IDENTIFIER | SOURCE | TARGET |
|---|---|---|
| . . . | . . . | . . . |
| a | à | at |
| ap | à Paris | in Paris |
| c | Celsius | Celsius |
| d1 | de | of |
| d2 | degrés | degrees |
| dc | degrés Celsius | degrees Celsius |
| e | est | is |
| o | observée | observed |
| oa | observée à | observed in |
| r | record | record |

TABLE 1-continued

Static bi-phrase table in a standard PB-SMT system

| STATIC BI-PHRASE IDENTIFIER | SOURCE | TARGET |
|---|---|---|
| t | température | temperature |
| u | une | a |
| . . . | . . . | . . . |

The decoder may select the subset {u, t, r, d1, dc, e, o, ap} in order to construct the translation, as illustrated graphically in FIG. 1. Decoding has the effect of selecting and ordering some of the phrases, resulting in the ordered list [u, r, t, d1, x, dc, e, o, ap], corresponding to the target sentence: a record temperature of 40.4 degrees Celsius is observed in Paris.

The decoder has ordered these bi-phrases in a specific order (t and r have been permuted), and has handled the number 40.4 through a special-purpose "catch-unknown" bi-phrase X that is of the form <X,X> which replaces an unknown source token X (i.e., a source token that has not been seen in the training bilingual corpus with sufficient frequency for it to appear in the bi-phrase table) by a copy of itself in the target. The selection of which bi-phrases to use (among all the bi-phrases compatible with the source sentence) and in which order to combine them is under the control of a standard log-linear model that assigns scores to the competing hypotheses. The log linear model may be of the form:

$$(t,a)^* = \mathrm{argmax}_{t,a} \exp \Sigma_i \lambda_i h_i(s,a,t) \tag{Eqn. 1}$$

where s is the source text, t is the target text, and a is the "alignment", that is, the ordered list of bi-phrases making up the translation. The $h_i$'s are the features, that is, functions that depend on s, a, and t, and the $\lambda_i$'s are weights applied to the respective features, which affect their relative importance. These weights may be adjusted by training the decoder on a bilingual corpus, e.g., a "development corpus", which can be a smaller corpus than the training corpus and use a different set of sentence pairs, although in the case of dynamic bi-phrases, other methods, discussed below, may be used for generating the weights. The decoder attempts to find the pair (t, a)* of a translation string t and an alignment a that maximizes the sum shown, and then outputs only the corresponding translation string t.

A task of the decoder is thus to search in this space of hypotheses for the one that maximizes the log-linear score. See Lopez, A. Statistical Machine Translation. *ACM Comput. Surv.*, 40 (3), 1-49 (2008) (hereinafter "Lopez 2008") and U.S. Pub No. 2007/0150257 for further details on log-linear models for SMT. It will be appreciated that the exemplary method is not limited to a log linear translation model, but that other models may be used.

As can be seen, the above translation produced by Table 1 is a literal translation, i.e., it does not take into account the fact that for some English speakers, a translation using degrees Fahrenheit instead of Celsius would be more favored, as in:

a record temperature of 104.7 degrees Fahrenheit is observed in Paris

Clearly, such translations are not generated using the standard approach. This is because the generalization mechanism that is at the heart of the standard PB-SMT approach is too limited to learn such patterns as:

x degrees Celsius=32+x*9/5 degrees Fahrenheit.

Moreover, even if the bi-phrase (degrés Celsius, degrees Fahrenheit) were to have a frequency in the training corpus, use of this bi-phrase would lead to an incorrect translation since 40.4 degrees Fahrenheit is not a correct translation of 40.4 degrés Celsius. The present system and method provide a solution to this. Instead of being limited to an automated translation using bi-phrases selected only from the static table, a user is free to provide instructions for constructing novel dynamic bi-phrases, enabling them to be added to an active bi-phrase table. For example, the user may wish to create a dynamic bi-phrase table as shown in Table 2:

TABLE 2

Dynamic bi-phrase table

Figure 2:
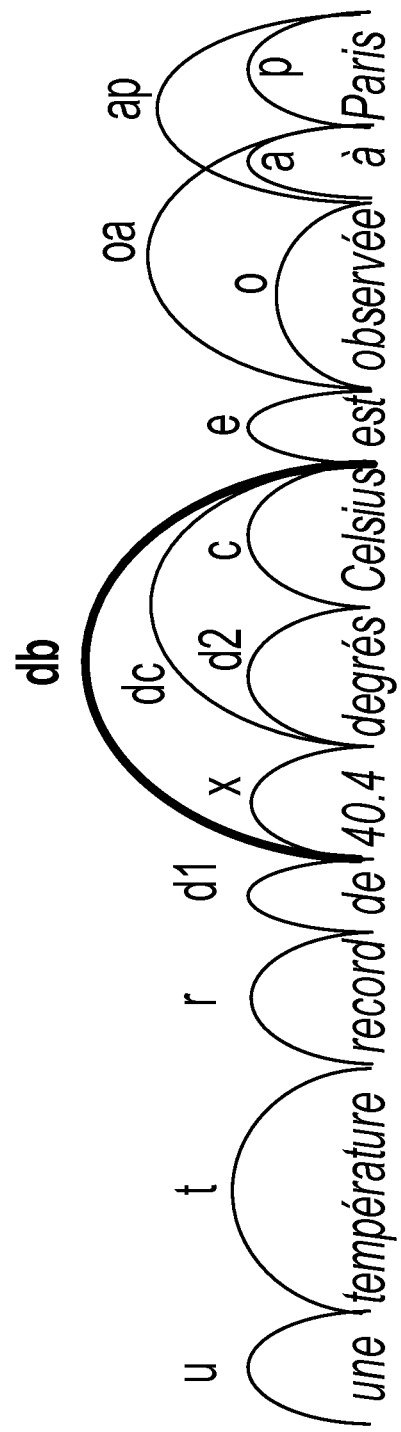
FIG. 2 is a graphical representation of a set of bi-phrases after insertion of a dynamic bi-phrase to the preexisting set of static bi-phrases for the source sentence of FIG. 1.

| DYNAMIC BI-PHRASE IDENTIFIER | SOURCE | TARGET |
|---|---|---|
| db | 40.4 degrés Celsius | 104.7 degrees Fahrenheit | where the identifier db of the dynamic bi-phrase is local to the current sentence, and where the bi-phrase has been constructed according to a "local translation rule" of the form: <If a pattern "NUMBER degrés Celsius" is found in the source sentence, then add a dynamic bi-phrase of the form:<NUMBER degrés Celsius, (32+NUMBER*9/5) degrees Fahrenheit>. Once the dynamic bi-phrase db has been added to the set of active bi-phrases, the graph can be represented as shown in FIG. 2. Although the translation rule/pattern may be available to the system prior to the input of the sentence to be translated, the actual bi-phrase, which is the result of applying the rule to the pattern (a specific temperature value followed by degrés Celsius) used in the sentence, cannot be determined until the sentence to be translated is input, since the value 40.4 is not known.

The decoder now works as previously described. However, db is one additional bi-phrase for constructing candidate translations. In the exemplary embodiment, the decoder is no more required to use db than it is to use any of the other bi-phrases. It will determine whether to use or not use it on the basis of the log-linear score that is computed for the different translation candidates. Thus, in the example shown, the translations using db, such as a record temperature of 104.7 degrees Fahrenheit is observed in Paris, will compete with a record temperature of 40.4 degrees Celsius is observed in Paris. The prevailing bi-phrase(s) will be determined by the nature of the features attached to the dynamic bi-phrases and also on weights learned during the training phase for these features.

Figure 3:
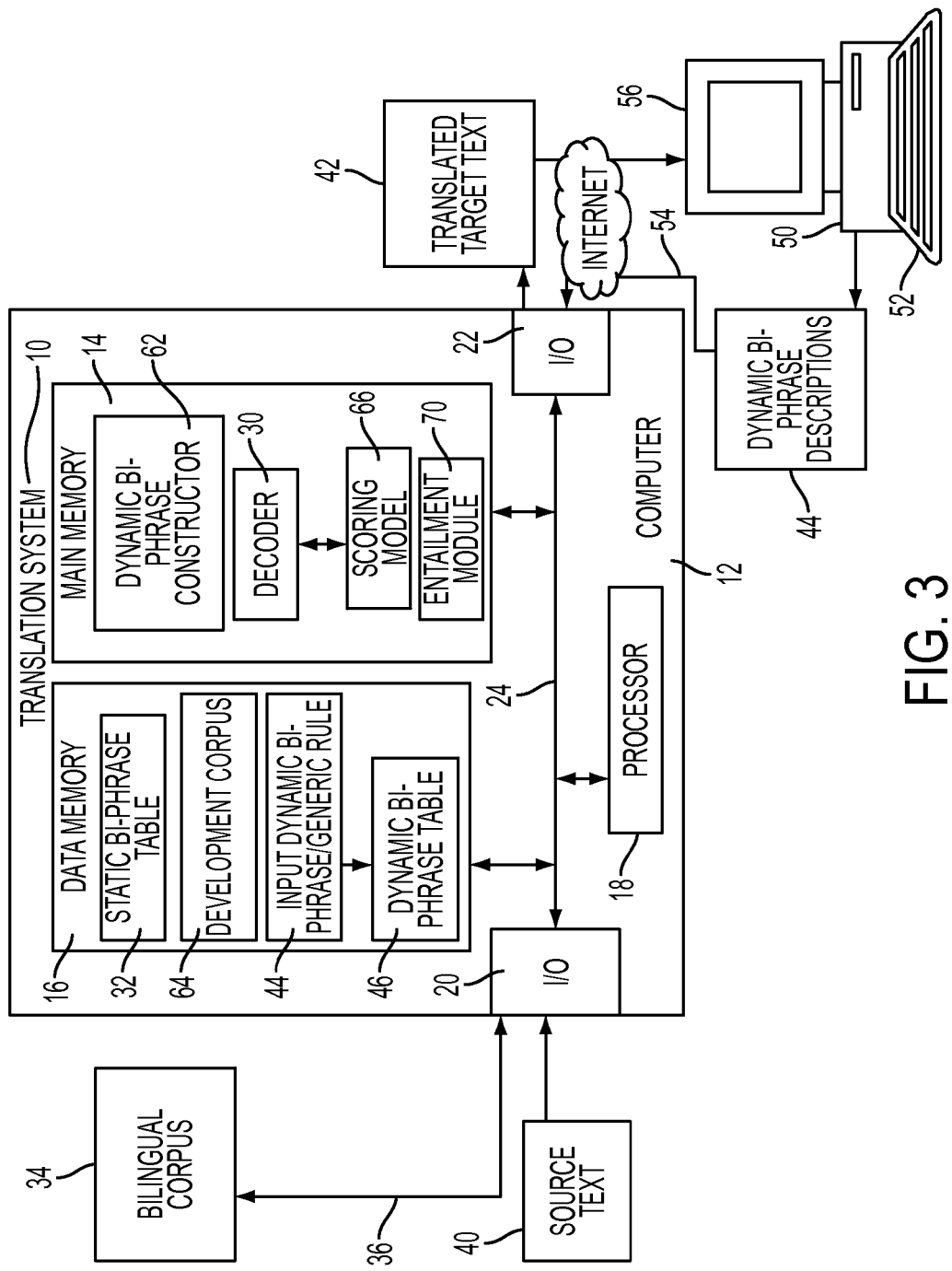
FIG. 3 illustrates a machine translation apparatus configured for utilizing static and dynamic bi-phrases.

FIG. 3 illustrates an exemplary translation system 10 which can be used in performing the exemplary method. The system 10 may be hosted by one or more computing devices 12. The exemplary computer 12 includes main memory 14, data memory 16, and a computer processor 18, as well as one or more input/output devices 20, 22, all connected by a data/control bus 24.

The translation system 10 includes a decoder 30. Exemplary decoder 30 includes software instructions stored in main memory 14 which are executed by the processor 18. Data memory 16, integral with or linked to the computer 12, stores a static bi-phrase table 32, which has been generated automatically from a bilingual corpus 34 of sentence pairs, each pair including a sentence in the source language and a sentence in the target language which have been determined, through automated means, to be likely translations of each other. The static bi-phrase table thus may include at least hundreds, or thousands of static bi-phrases, e.g., at least 5,000 or at least 10,000 bi-phrases, and may be extracted from a collection of bisentences selected according to the specific domain in which the translation system is to be used. One example is the Europarl corpus of about one million bisentences. The source and target languages can be any two natural languages, such as French and English in the examples herein. The bilingual corpus 34 may be stored in memory 16 or in a separate memory storage device that is accessible to the computer 12 via a wired or wireless link 36.

Input 20 receives source text 40 comprising one or more source sentences or shorter text strings in digital form, which may be stored in data memory 16 during processing. The system 10 translates the source text 40 into target text 42, which is output from the system, e.g., via interface 22.

Input 20 or 22 may also receive dynamic bi-phrase descriptions 44 input by a user, which may be stored in data memory 16 and used in the generation of rules from which dynamic bi-phrases can be generated at translation time to be stored, at least temporarily, in a dynamic bi-phrase table 46. Inputs 20, 22 can each be a network connection which connects the computer 10 via wires and/or wirelessly with a text source, such as a scanner, other computer, a wide area network, such as the Internet, or may be a port for receiving a physical storage medium, such as a disk or flash memory card, or the like on which the source text 40 is stored.

In the exemplary embodiment, the input/output interface 22 is connected with a user interface, such as a computer 50, which serves as a graphical user interface (GUI). A user can input a dynamic bi-phrase pattern or a generic bi-phrase generation rule (collectively referred to as dynamic bi-phrase descriptions 44) via the GUI, e.g., through typing on an input device 52, such as keyboard, keypad, touch screen, or the like. The user's dynamic bi-phrase selections are communicated to the system 10 via a wired or wireless link 54 such as a local network connection or over the Internet via a web browser displayed on the user's screen 56.

Dynamic bi-phrase descriptions 44, in the form of patterns or rules, which have been input by the user, from which dynamic bi-phrases can be computed, are recognized by a dynamic bi-phrase constructor 62. Dynamic bi-phrase constructor 62 generates a dynamic bi-phrase or dynamic bi-phrase generation rule from the input description, and associates the dynamic bi-phrase/rule with feature values and their weights that are then used to construct the dynamic bi-phrase table 46 at translation time. In other embodiments, the constructor 62 may generate a dynamic bi-phrase without the benefit of a user description. A development corpus 64, stored, for example, in memory 16 or in a separate memory accessible to the system 10, may be used by constructor 62 in generating the feature weights for the dynamic bi-phrases, as described in greater detail below. Then, treating each sentence of the source text 40 as a sequence of tokens, the decoder 30 retrieves static bi-phrases from the static bi-phrase table 32 which cover one or more words of the source sentence. Decoder 30 also retrieves dynamic bi-phrases from the dynamic bi-phrase table 46 which cover one or more words of the source sentence. The static and dynamic bi-phrases become the set of active bi-phrases for that particular source sentence. On average, the active set includes fewer dynamic bi-phrases than static ones. The active bi-phrases are used to form any number of hypotheses, each of which may include different bi-phrases and/or ordering of bi-phrases. These hypotheses are assessed with a scoring model 66, such as the log-linear model (Eqn. 1), either for the entire source sentence 40 or piece-wise, to identify the optimum scoring target sentence 42 which is output as the translation.

The computing device 12 may be a PC, such as a desktop, a laptop, palmtop computer, portable digital assistant (PDA), server computer, cellular telephone, or other computing device capable of executing instructions for performing the exemplary method described below with reference to FIG. 4. Memory 14 stores instructions for performing the exemplary method. The input and processed data may be stored in memory 16. Memories 14, 16 may be separate or combined and may each represent any type of tangible computer readable medium such as random access memory (RAM), read only memory (ROM), magnetic disk or tape, optical disk, flash memory, or holographic memory. In one embodiment, the memory 14, 16 comprises a combination of random access memory and read only memory. In some embodiments, the processor 18 and memory 14 may be combined in a single chip. The network interface(s) 20, 22 allow the computer to communicate with other devices via a computer network, such as a local area network (LAN) or wide area network (WAN), or the internet, and may comprise a modulator/demodulator (MODEM).

Figure 4:
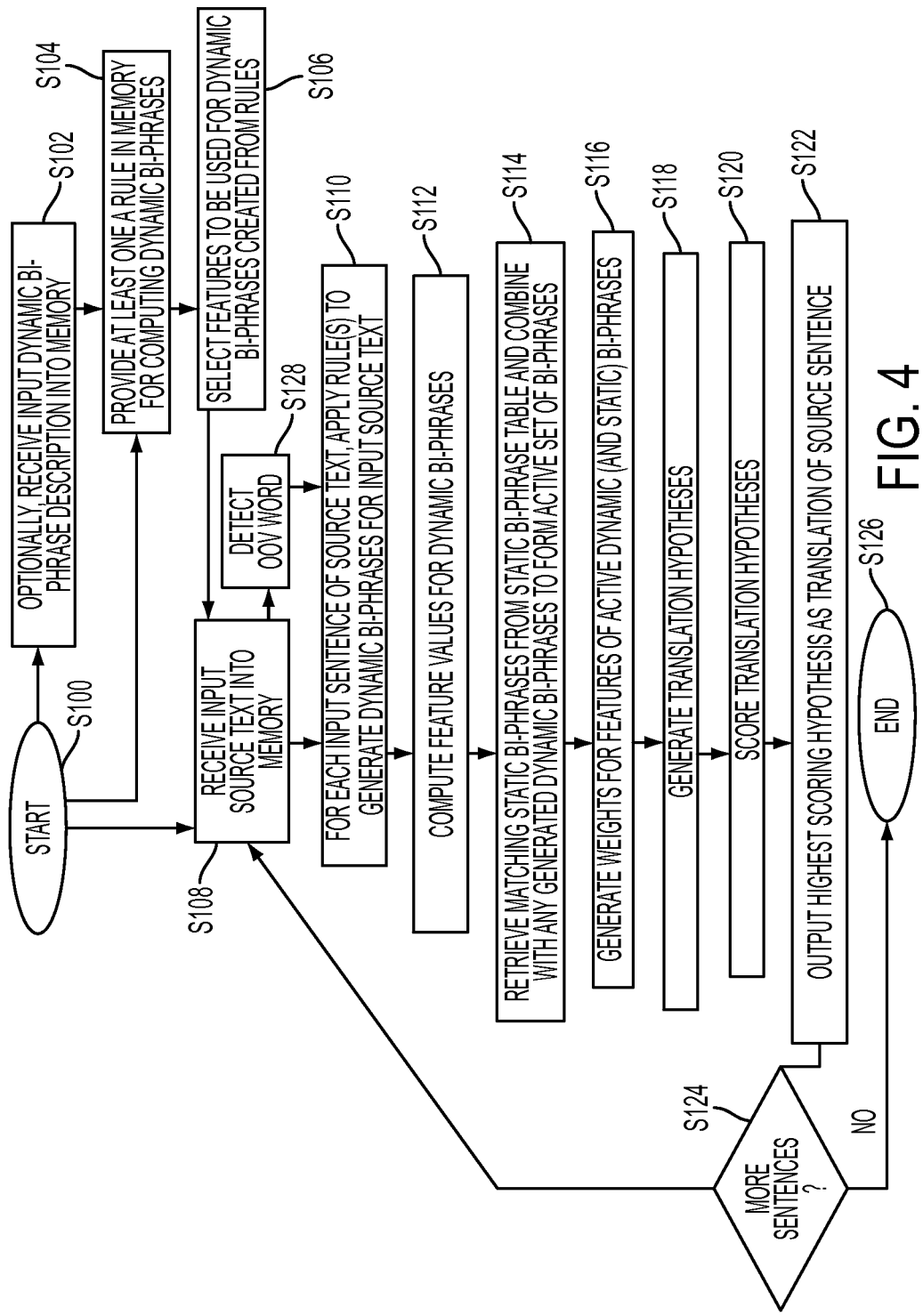
FIG. 4 illustrates a machine translation method utilizing static and dynamic bi-phrases.

The digital processor 18 executes instructions for performing the method outlined in FIG. 4. The processor 18 can be variously embodied, such as by a single-core processor, a dual-core processor (or more generally by a multiple-core processor), a digital processor and cooperating math coprocessor, a digital controller, or the like. The exemplary digital processor 18 is a CPU which, in addition to controlling the operation of the computer 12, executes instructions stored in memory 14 for performing the method outlined in FIG. 4.

As will be appreciated, FIG. 3 is a high level functional block diagram of only a portion of the components which are incorporated into a computer device 12. Since the configuration and operation of programmable computers are well known, they will not be described further.

FIG. 4 illustrates an exemplary method for phrase-based SMT which utilizes dynamic bi-phrases in accordance with the exemplary embodiment. The method can be performed with a translation system of the type illustrated in FIG. 3. The method begins at S100. The method assumes that the system has been enabled for use of dynamic bi-phrases and has available to it, a table of static bi-phrases.

At S102, optionally, one or more dynamic bi-phrase descriptions 42 to be used in the translation of source text 40 is/are input to the system 10 and stored in memory 14. (In some instances, the dynamic bi-phrases are generated automatically, or semi-automatically, after the source text is entered, e.g., by textual entailment for OOV words, as described below).

At S104, each input description is converted into a separate (pattern-based) rule for later generation of dynamic bi-phrases based on input text. Alternatively or additionally, rules may be provided for generating dynamic bi-phrases for handling OOV words and the like.

At S106, feature types may be selected for use with the dynamic bi-phrases generated by applying the rule to input text. As will be appreciated, once the rules have been generated, they may be incorporated into the algorithm applied by the system and steps S102-S106 need not be repeated, unless the user wishes the system to generate new rules.

At S108, source text 40 in a source language is input to system 10 and stored in computer memory 16 during processing.

At S110, for each sentence or shorter text string of the input source text to be translated, dynamic bi-phrases are generated, based on the input text, e.g., by application of the rules to the input text. (If the sentence does not cause any of the dynamic bi-phrase generation rules to be fired, this step is omitted and the method proceeds to S116).

At S112, feature values for the dynamic bi-phrases are computed.

At S114, static bi-phrases are retrieved the static bi-phrase table 32 and combined with the dynamic-bi-phrases to generate an active set of bi-phrases.

At S116, weights for the features of the active set of dynamic bi-phrases (and static bi-phrases) are learned, e.g., using the development corpus 64 of bilingual sentences.

At S118, the active set of static and dynamic bi-phrases is used to generate translation hypotheses, each hypothesis comprising an alignment between source and target bi-phrases. In general, each hypothesis is required to conform to certain rules, such as a requirement that each word in the source sentence must be covered by exactly one of the retrieved bi-phrases.

At S120, the hypotheses are scored with the scoring model 66.

At S122, a highest scoring hypothesis is output as the translation 42 of the source sentence 40. Steps S110-S122 of the method may be repeated if at S124 there is more than one source sentence to be translated.

The method ends at S126.

In the case of an OOV word being present in the input source text, optionally, at S128, the method includes detection of the OOV word. The method proceeds to step S110, in which a bi-phrase for the OOV word is generated, and continues through steps S112-S122.

The method illustrated in FIG. 4 may be implemented in a computer program product that may be executed on a computer. The computer program product may be a tangible computer-readable recording medium on which a control program is recorded, such as a disk, hard drive, or the like. Common forms of tangible computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in an intangible form, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method phrase-based statistical machine translation employing dynamic bi-phrases.

Further details of the system and method now follow.

Input of Dynamic Bi-Phrase Descriptions (S102)

In some cases, the patterns for generating rules for computing dynamic bi-phrases (or the rules themselves) may be input by a user, e.g., as in the case of centigrade to Fahrenheit conversion. In other cases, the system 10 may propose dynamic bi-phrases, e.g., in the case of OOV words, based on the application of rules for generating them form the input sentences and, in some cases, from external resources, such as WordNet™.

Rule Generation (S104)

The system generates a rule from the user's description. For example, if the user's description requests a conversion of degrees Centigrade to degrees Fahrenheit, the system may ask the user to input a conversion factor or retrieve one from an online resource. The system then generates a rule which is fired to generate a dynamic bi-phrase whenever a specific pattern "X degrees Centigrade" is observed in a source sentence.

Feature Selection (S106) and Generation of Feature Values (S112)

Standard SMT models associate features $h_i(s,a,t)$ to candidate alignment-translation pairs. Among these features, some are associated with static bi-phrases, e.g., features that estimate the conditional probability of observing, in a corpus 34, the target side of the bi-phrase given that the source side has been observed. These "static" bi-phrase features are computed at training time, along with the process that extracts the static bi-phrases from the bilingual corpus, and are associated with corresponding entries in the bi-phrase table 32, as exemplified in the active bi-phrase table shown in TABLE 1.

Such features are not directly available for dynamic bi-phrases, which are created "on the fly", through a completely different process. In order to handle dynamic bi-phrases on a par with static bi-phrases during decoding, two types of features may be associated with the dynamic bi-phrases:

(i) default values for the each of the static bi-phrase features that are already associated with the static bi-phrases; and (ii) new "dynamic" bi-phrase features that permit distinguishing among them.

In one embodiment, the number of features associated with all bi-phrases is increased, by adding dynamic features values to all bi-phrases. Thus, each bi-phrase has a vector of static features and also a vector of dynamic features. For example, for static bi-phrases, the values of the dynamic features are all 0, while conversely, for all dynamic bi-phrases, the values of the static features are all 0.

By way of example, TABLE 3 lists exemplary static and dynamic bi-phrases along with their features. For purposes of illustration, it is assumed that there are only 4 bi-phrase features in all, two of which are static and two which are dynamic. In addition to the features that are associated with specific bi-phrases, the log-linear model generally also includes other features, such as lm, a language model feature, and d, a distortion feature. All these features enter in the computation of the log-linear score along with the bi-phrase (static and dynamic) features.

TABLE 3

Examples of static and dynamic features

| Bi-phrase type | Source | Target | Static features $h_f$ | Static features $h_r$ | Dynamic features $h_{tc}$ | Dynamic features $h_{fc}$ |
|---|---|---|---|---|---|---|
| static | Cassa | broke | −1.2 | −1.7 | 0 | 0 |
| | cassa sa pipe | kicked the bucket | −0.8 | −0.3 | 0 | 0 |
| | Degrés | degrees | −0.7 | −0.2 | 0 | 0 |
| | Celsius | Celsius | −0.1 | −0.1 | 0 | 0 |
| dynamic | 40.4 degrees Celsius | 104.7 degrees Fahrenheit | 0 | 0 | −1 | 0 |
| | 7.84 litres aux cents | 30 miles per gallon | 0 | 0 | 0 | −1 |

In the above example, each static bi-phrase has 2 features, a forward feature $h_f$ that estimates the (log of the) conditional probability $\log p(\bar{t}|\bar{s})$ of finding the target $\bar{t}$ of the bi-phrase given its source $\bar{s}$ in the training corpus 34, and a corresponding reverse feature $h_r$ that estimates $\log p(\bar{s}|\bar{t})$. For the dynamic bi-phrases, two different types of feature are shown, one $h_{tc}$, corresponding to a local translation rule for translating temperature expressions from French to English, the other $h_{fc}$ to a local translation rule for translating fuel-consumption expressions between the two languages. The feature $h_{tc}$ (resp. $h_{fc}$) is an indicator (with 0 indicating absence, −1 indicating presence). The feature $h_{tc}$ is defined to be negative when present (i.e., 0 indicating absence and −1 presence of the dynamic bi-phrase). This keeps the conventions aligned with the fact that using a bi-phrase (whether static or dynamic) is viewed as a cost. In particular, static features such as $h_f$ are logs of probabilities, that is, are always non-positive. The values also take account of the fact that the bi-phrase is dynamic, and of specific type "temperature conversion rule" (resp. of specific type "fuel-consumption rule").

In the illustration of "dynamic features" in Table 3, each dynamic bi-phrase has all its "static features" as zero. However, it is also contemplated that the dynamic bi-phrases may be assigned non-zero values of the static features. Also, in this example, the only dynamic features are identifiers of the presence/absence of a certain type of dynamic bi-phrase. Other types of dynamic features may additionally or alternatively be used. These features may take real values. When the dynamic bi-phrase has some relation with existing static bi-phrases (which is for instance the case for their use in an OOV/textual-entailment context, as described in greater detail below), it can also be useful to introduce dynamic features that "copy" the values (or are transforms of the values) of the related static bi-phrases.

Training the Weights of Static/Dynamic Features to Generate Suitable Weights (S116)

In some cases, the training (S116) may be performed prior to inputting the source text. In other cases, this may not be possible, as outlined below.

Once the features have been defined and assigned values, the training of the corresponding log-linear weights $\lambda_f$, $\lambda_r$, $\lambda_{tc}$, $\lambda_{fc}$ can, in principle, proceed in the usual way on the basis of a bilingual development corpus 64. The purpose of the training is to assign weights which will provide the best quality of translation which can be obtained, using the available bi-phrases. For this step, reference translations may be provided as the target sentences (e.g., generated manually for the source text sentences) and the resulting machine translations generated by using different weights are compared with the corresponding reference translations to identify the weights which give the closest translations to the reference translations. The evaluation of the quality of the translations using different weights can be done manually or performed using a translation scoring system such as BLEU.

In training the λ weights, the dynamic bi-phrases do not need to be distinguished formally from the static ones. The system thus attempts to give values to the weights in such a way that the performance of the decoder 30 on the development corpus 64 of bi-sentences is the best possible, and then uses the trained weight for decoding novel sentences.

During this training, dynamic bi-phrases may remain in competition with static bi-phrases. The prevailing bi-phrase, in any translation, will then be determined by the nature of the development corpus 64. For example, in the case of the temperature conversion rule, if the development corpus never includes sentence pairs where conversions of Celsius into Fahrenheit are made, then the use of the static bi-phrases (degrés, degrees) and (Celsius, Celsius) will be preferred by the training procedure over that of the dynamic bi-phrase. This will have the effect of tuning the weight $\lambda_{tc}$ to a large positive value (meaning that the use of this dynamic bi-phrase is very costly). Conversely, if the development corpus 64 contains mostly conversions of Celsius into Fahrenheit, then the weight $\lambda_{tc}$ will be trained to a small positive (or a negative value), ensuring the preference of the training procedure for the dynamic bi-phrase.

As will be appreciated, several competing local translation rules may be defined for translating the same source expression. For example in addition to the fuel consumption rule associated with feature $h_{fc}$, another conversion rule with a feature $h_{flc}$ of the form: X litres aux cents->X liters per hundred kilometers, could be defined. This would help to ensure that if at least one of these rules were to be found in the training data, a strict word-for-word compositional translation based on static bi-phrases leading to the clumsy: X liters to the hundreds, would be less likely to prevail. In this case, a static bi-phrase (litres aux cents, liters per hundred kilometers) may already exist in the bi-phrase table, which would render the rule $h_{flc}$ redundant, although one difference would be that the rule is able to make use of the context X, which the static bi-phrase does not do.

Training Many Dynamic Features on a Small Development Corpus (S116)

TABLE 3 demonstrates the flexibility and power of dynamic bi-phrases (i) for manually proposing local translation rules and (ii) for automatically tuning their actual usefulness on the basis of training data. This approach can be applied quite extensively. For example, many different types of dynamic bi-phrases can be defined, each with its specific identifier.

Standard procedures for tuning λ weights, however, such as MERT (minimum error rate training), or derivatives of this method (see Lopez 2008), make use of a relatively small development corpus 64 of a few hundred bisentences (matched source and target sentences). This is to be contrasted to the much larger bilingual corpus (the training corpus 34), which may contain millions of bisentences, from which the static bi-phrases are automatically extracted. The reason for keeping the development corpus small is that MERT requires the source sentences of this corpus to be translated iteratively, and for each translation, not only the top translation candidate (i.e., the most highly scored according to the log-linear score of Eqn. 1) is computed, but also a relatively large sample of lower-scored candidates. Additionally, the development corpus is generally kept separate from the training corpus in order to avoid fitting the λ weights on the same set of sentences from which the static bi-phrases have been extracted.

With a development corpus 64 of only a few hundred sentences, it is not feasible to train a large number of type-specific features of the kind shown in TABLE 3. It could well be, for example, that the temperature conversion type only occurs once in a conventional development corpus, and that the fuel conversion type never occurs in this set of sentences.

In one embodiment, this problem is addressed by artificially constructing the development corpus 64 so as to contain several instances of the dynamic bi-phrase types whose λ weights are to be estimated. However this biases the development corpus to contain a larger proportion of these cases than is correct. This could lead to an inexact estimation for the static bi-phrase weights. To reduce this effect, the MERT procedure may be adapted to give more relevance to "standard" bisentences than to those that correspond to a dynamic type.

In another embodiment, generic dynamic bi-phrase types are constructed as outlined below, which facilitate training on a development corpus.

Generic Dynamic Bi-Phrases

In this embodiment, different dynamic bi-phrase types are tied together as follows. Rather than having, for example, a large number (e.g., a hundred) of different dynamic types $T_i$, each with its own identifying dynamic feature $h_i$ taking its value in the set $\{0,-1\}$, a much smaller number of generic features $h_{g1}, \ldots, h_{gk}, \ldots, h_{gK}$, etc. may be defined, where K is a small number such as from 1-10, and in some embodiments, K is equal to 1 or 2. Each of the weights for these features takes a real value, with $h_{gk}$ taking, in this example, 101 values, the value 0 coding for "no dynamic type of the form $T_i$ involved (whatever i)", and the other 100 values being real numbers $h_{gk}(T_i)$ representing an assessment (relative to the k'th "submodel") of the "cost" of using a dynamic bi-phrase of type $T_i$.

A value for a generic bi-phrase feature $h_{g1}$ may be determined as follows: Suppose that the types $T_i$ have each an interpretation of the kind: "replace a source pattern of type $source_i$ by a target pattern of type $target_i$" (as is the case with the temperature conversion and fuel conversion types). Then define the conditional probability of finding the source and target bi-phrases together in a training corpus bisentence as follows:

$$h_{g1}(T_i) \equiv \log \frac{count(source_i, target_i)}{count(source_i)}$$

where $count(source_i)$ is the number of instances of observing the pattern $source_i$ in a bisentence of the whole training corpus 34 (rather than in the limited development corpus 64), and $count(source_i, target_i)$ is the number of instances of observing both $source_i$ and $target_i$ in the same bisentence of the whole training corpus 34. As will be appreciated, the reverse feature can be computed analogously but using:

$$h_{g1}(T_i) \equiv \log \frac{count(target_i, source_i)}{count(target_i)}$$

This is similar to what is done when a feature such as $h_f(\tilde{s}, \tilde{t}) = \log p(\tilde{t}|\tilde{s})$ is assigned to a static bi-phrase $(\tilde{s}, \tilde{t})$ in the standard model. However, in this case, each $T_i$ is not a simple "pattern" such as (à Paris, in Paris), but rather a complex pattern such as (NUMBER degrés Celsius, (32+NUMBER*9/5) degrees Fahrenheit).

Another difference with the standard way log $p(\tilde{t}|\tilde{s})$ (e.g., for computing $h_f$) is estimated is that the counts in the standard case are based on respecting certain word-alignment constraints (e.g., when implemented with the GIZA++ word alignment system) when "detecting" the bi-phrase ($\tilde{s}$, $\tilde{t}$) in a bisentence of the training corpus. For the dynamic bi-phrases, however, a simpler but efficient technique can be to detect whether the pattern, such as NUMBER degrés Celsius, is observed anywhere on the source side of the bisentence while the corresponding pattern, (32+NUMBER*9/5) degrees Fahrenheit, is observed anywhere on its target side, i.e., it is counted independent of whether the source and target phrases are actually output as being aligned to each other. This could, of course, be refined to allow for more detailed knowledge of possible alignments.

This method thus differs from the way in which static bi-phrases are extracted, where the phrases in the bisentence must be aligned with each other (either as individual word alignments or as a phrase alignment) for the respective bi-phrase to be detected and counted. In the case of dynamic types, the rule is stated because a person has a strong a priori belief that it is relevant, i.e., to be an expected translation, whereas in the case of static bi-phrases, the bi-phrases are automatically detected by the extraction mechanism. If there were not strong alignment constraints in the static bi-phrase case, the extraction procedure could propose very unlikely bi-phrases such as (the cat, du lait) in the bisentence (the cat drinks milk, le chat boit du lait). This risk is much lower in the case of dynamic bi-phrases where the pattern is one proposed a priori by a human.

Once the feature values (e.g., forward and reverse features, as described above) are computed in this way, the weights can be computed by testing candidate weights on a development corpus (S108).

An example of the way the generic features of dynamic bi-phrases may operate is illustrated in TABLE 4.

TABLE 4

Generic dynamic bi-phrase features

| bi-phrase | | | static features | | dynamic features | |
|---|---|---|---|---|---|---|
| type | source | target | $h_f$ | $h_r$ | $h_{g1}$ | $h_{g2}$ |
| static | Cassa | broke | −1.2 | −1.7 | 0 | 0 |
| | cassa sa pipe | kicked the bucket | −0.8 | −0.3 | 0 | 0 |
| | degrés Celsius | degrees Celsius | −0.7 −0.1 | −0.2 −0.1 | 0 0 | 0 0 |
| dynamic | [X] degrés Celsius | [32 + 9X/5] degrees Fahrenheit | 0 | 0 | −0.05 | −0.08 |
| | [X] litres aux cents | [235.2/X] miles per gallon | 0 | 0 | −0.4 | −0.6 |

The entries for dynamic bi-phrases in TABLE 4 are actually patterns that are instantiated by many possible bi-phrases, depending on the instantiation of the number X. Whatever the instantiation for X, the values of the dynamic features are the same for a given pattern (that is, for a given dynamic bi-phrase type). The system may thus be configured for generating a source phrase, target phrase pattern where the source phrase includes a variable amount expressed in a first type of units (e.g., degrees Celsius) and the target phrase includes a variable amount expressed in a second type of units (e.g., degrees Fahrenheit) expressed as an equation for conversion of the value in the first type of units to the value in the second type of units.

In a similar manner, other generic features may be defined, such as $h_{g2}$ corresponding to the "converse" of $h_{g1}$, (that is log count(source$_i$,target$_i$)/count(target$_i$)), or to a "p-value" measure of independence of target$_i$ relative to source$_i$, etc. p-value can be computed using Fisher's Exact Test. This is a statistical test for association in a table based on the exact hypergeometric distribution of the frequencies within the table. The test computes the probability ("p-value") that a certain joint event, here the joint occurrence of source$_i$, and target$_i$ in the source and target side of the same bi-sentence appears under a so-called "null hypothesis" that corresponds to the situation where source$_i$, and target$_i$ are actually statistically independent. See above-mentioned application Ser. No. 12/427,149 for a fuller description of methods for determining p values.

Applications for Dynamic Bi-Phrases

There are many potential applications for dynamic bi-phrases in SMT, the following are only examples:

1. Local Translation Rules

As exemplified above, the conversion rules for temperature and fuel consumption are both instances of local translation rules in which the system looks for a pattern which fires the rule. Other examples include:

a. Date conversion: Nov. 9, 2001 (France)→Sep. 11, 2001 (US), which could be expressed by a generic rule which switches the digit(s) before the first dash with the digit(s) after it.

b. Numerical expressions: 54.7 (France)→54.7 (US) which could be expressed by a generic rule: replace NUMBER1,NUMBER2 with NUMBER1.NUMBER2.

There are many similar examples in technical documentation, when each language has certain conventions for certain technical expressions.

2. Statistical MT-Rule Based MT Hybridization

Dynamic bi-phrases can be used to provide a phrase-based SMT system with input from a different (e.g., rule-based SMT) translation system, or from several other translation systems simultaneously. So if a user expects that certain source patterns (e.g., complex verbal constructions involving auxiliaries and clitics such as "ne les auraient pas vues") are better translated by a rule-based system than by the given phrase-based SMT system, then a rule-based translation "would not have seen them" could be inserted in the bi-phrase graph as the dynamic bi-phrase (ne les auraient pas vues, would not have seen them) along with some features indicating that the translation came from this specific system. Then, all these bi-phrases are able to compete between each other and with the static bi-phrases during decoding.

3. Parenthetical Material

A particular case of calling a translation system on a sub-sequence of the input sentence is that of a source sentence containing parenthetical material, as in "le député (parlant en son nom personnel) nous a dit . . . ". It is often advisable to translate the parenthetical expression separately rather than let the phrase-based system use its standard procedures (which may well, for instance, extract a token from the interior of the parenthesis and translate it outside of it). With dynamic bi-phrases, this can be done by calling the same PB-SMT system recursively on the expression inside the parenthesis, and then providing to the main system the local translation in the form of a dynamic bi-phrase.

Generalizing this approach to the case of a full syntactic analysis of the source sentence while possible, would involve handling calls at different recursive levels, and also designing convincing schemes for avoiding the combinatorial explosion involved in percolating to the top the several different results provided by the local translators at the different syntactic levels.

4. Contextual Dependencies

Often, a certain static bi-phrase can be more or less appropriate depending on its context in the sentence, and features can be defined that give an estimate of that appropriateness. Dynamic bi-phrases provide a mechanism to use such additional information. This may include constructing a dynamic bi-phrase that is a clone of the static bi-phrase, but which, in addition, provides a value for the contextual feature (which can only be computed at the point where the source sentence is known). While contextual features have been suggested (see Carpuat, M., & Wu, D. Context-Dependent Phrasal Translation Lexicons for Statistical Machine Translation. *Machine Translation Summit XI*. Copenhagen (2007)) the difference here is in the use of the generic formalism of dynamic bi-phrases to exploit that additional information.

5. OOV Words and Textual Entailment

OOV (out-of-vocabulary) words are a problem in translations for source expressions that have not been seen during bilingual training (see Mirkin, S., Specia, L., Cancedda, N., Dagan, I., Dymetman, M., & Szpektor, I. Source-Language Entailment Modeling for Translating Unknown Terms. *ACL-IJNLP* (2009)).

In the exemplary embodiment, when an OOV word is detected at S128, of the method may proceed as follows:

a) first paraphrasing the unknown source expression, which can be a word or phrase, as a source expression that is known to the static bi-phrase table (e.g., using textual entailment techniques, or a lexical resource, such as WordNet™);

b) generating a dynamic bi-phrase which includes the unknown source phrase and a target phrase from a static bi-phrase which includes the paraphrase as the source phrase (S110);

c) generating one or more OOV feature values for the new dynamic bi-phrase, as well as one or feature values copied from or otherwise derived from the static bi-phrase (S112); and d) associating a weight for the dynamic contextual entailment bi-phrase feature(s), which may be based on a weight used for the corresponding static bi-phrase feature (S116).

As an example, suppose that a user wishes to translate the English sentence: "the mayor was attacked by the press for corruption" into French. Also assume that no English-→French static bi-phrase contains the source word "attacked". The default behavior of the PB-SMT system is to leave the OOV word "attacked" as is and copy it to the target sentence, obtaining such a translation as: "le maire a été attacked par la presse pour corruption". In the exemplary method, the system may prompt the user when an OOV word is detected. An English word that is a paraphrase of "attacked", or at least that is "textually entailed" by "attacked" is found. This may be performed by an entailment module 70 of the system 10, and the possible paraphrases verified by the user. Textual entailment is a generalization of paraphrasing that only requires that the "entailee" is implied by the "entailer", but not necessarily the converse.

The entailment module 70 may operate by finding similar words from a lexical resource. For example, for each sentence with an OOV word, a set of alternative source sentences is generated by directly replacing each OOV word by synonyms from WordNet™ or, if no synonyms are not found, by hypernyms. All the alternative source sentences are translated using a standard SMT system and the one which scores highest, according to one or more translation scoring metrics, is assumed to include the closest paraphrase.

Alternatively, the entailment module 70 may operate by identifying the context in which the OOV is used in the sentence and identifying source sentences in the bilingual corpus 34 in which the contexts are the same but the OOV is replaced with a different word. Thus for example, in the sentence "the mayor was attacked by the press for corruption" the system may look for sentences where the words "the mayor" appear as the object of a verb, and if possible, where the verb appears after it, and if possible, where there is a subject of the verb present in the sentence. The system may similarly look for sentences where "the press" is the subject of a verb, and if possible, where the verb appears before it and if possible, where there is an object of the verb in the same sentence. In particular, the system looks first for sentences where both of these contexts for the unidentified verb are found. The verbs in the same contexts are extracted and the most likely, according to a scoring method, may be presented to the user.

Methods for identifying textual entailment are disclosed, for example, in Mirkin, S., Specia, L., Cancedda, N., Dagan, I., Dymetman, M., and Szpektor, I. (2009). Source-Language Entailment Modeling for Translating Unknown Terms. *ACL-IJNLP*; Stéphane Clinchant, Cyril Goutte, and Eric Gaussier, Lexical entailment for information retrieval, European Conference on Information Retrieval, London, UK, 10-12 Apr. 2006; and U.S. Pub. No. 2010/0070521, published Mar. 18, 2010, entitled QUERY TRANSLATION THROUGH DICTIONARY ADAPTATION, by Clinchant, et al., the disclosure of which is incorporated herein by reference in its entirety.

Applying textual entailment techniques to "attacked", the user may find that the words "accused" and "hit" are possible entailments. Three real-valued OOV features can then be computed for assessing the quality of the entailment:

1. The domain similarity feature $h_{ds}$ assesses the replacement (e.g., of "attacked" by "accused") according to how similar the two words are in the overall corpus, for example because these two words are frequently used in similar contexts in this corpus;

2. The contextual entailment feature $h_{ce}$ assesses the replacement according to how much "attacked" entails "accused" relative to the specific sentence in which it appears, for example because the second word is frequently used in sentences of the corpus that are similar to this specific sentence;

3. The information loss feature $h_{il}$ assesses the replacement according to how much "attacked" is related to "accused" relative to a hierarchy of concepts such as WordNet (using a certain notion of distance between two nodes in the hierarchy).

For illustration purposes, suppose that these features have the values shown in TABLE 5.

TABLE 5

| Source word | Replacement | $h_{ds}$ | $h_{ce}$ | $h_{il}$ |
|---|---|---|---|---|
| attacked | accused | −3.1 | −0.3 | −0.4 |
| attacked | hit | −5.2 | −7.2 | −0.5 |

Once the possible entailees "accused" and "hit" have been thus determined, along with their three features, dynamic bi-phrases are then created. In order to do that, from the static bi-phrase table, all bi-phrases translating either "accused" or "hit" are retrieved, finding among others the bi-phrases (accused, accuse), (hit, touché), (hit, coup), and the like. The system may also take into account static bi-phrases such as (was accused, a été accusé), etc., where the source side can be a multiword expression.

Each of these bi-phrases is associated in the table with its standard features $h_f$ and $h_r$, so that for example, the static information shown in TABLE 6 may be obtained:

TABLE 6

|  | Source word | Target Word | $h_f$ | $h_r$ |
|---|---|---|---|---|
| static bi-phrases | accused | accusé | −1.6 | −1.2 |
|  | hit | touché | −0.9 | −0.5 |
|  | hit | coup | −3.7 | −0.4 |

The following dynamic bi-phrases may be defined that are specific to the source sentence to be translated:

TABLE 7

|  | Source word | Target Word | $h_{ds}$ | $h_{ce}$ | $h_{il}$ | $h_{fc}$ |
|---|---|---|---|---|---|---|
| dynamic | attacked | accusé | −3.1 | −0.3 | −0.4 | −1.6 |
| bi-phrases | attacked | touché | −5.2 | −7.2 | −0.5 | −0.9 |
|  | attacked | coup | −5.2 | −7.2 | −0.5 | −3.7 |

These dynamic bi-phrases are obtained by "composing" a replacement (e.g. attacked→accused) with a static bi-phrase (e.g. accused→accusé) and by associating with the dynamic bi-phrase (attacked→accuse) four dynamic features, the first three being just the values of the three entailment features $h_{ds}$, $h_{ce}$, $h_{il}$ and the fourth, $h_{fc}$, being a "clone" of the static feature $h_f$ associated with the corresponding static bi-phrase (accused→accusé).

An overall picture of both the static and dynamic bi-phrases that are relevant to translating the sentence "the mayor was attacked by the press for corruption" is given by TABLE 8, where only a few of the active bi-phrases are illustrated:

TABLE 8

|  |  |  | static features | | dynamic features | | | |
|---|---|---|---|---|---|---|---|---|
|  | source | target | $h_f$ | $h_r$ | $h_{ds}$ | $h_{ce}$ | $h_{il}$ | $h_{fc}$ |
| static | mayor | maire | −0.1 | −0.1 | 0 | 0 | 0 | 0 |
| bi-phrases | press | presse | −1.5 | −0.7 | 0 | 0 | 0 | 0 |
|  | was | a été | −0.6 | −0.2 | 0 | 0 | 0 | 0 |
|  | was | était | −0.4 | −0.3 | 0 | 0 | 0 | 0 |
| dynamic | attacked | accusé | 0 | 0 | −3.1 | −0.3 | −0.4 | −1.6 |
| bi-phrases | attacked | touché | 0 | 0 | −5.2 | −7.2 | −0.5 | −0.9 |
|  | attacked | coup | 0 | 0 | −5.2 | −7.2 | −0.5 | −3.7 |

Note that the user has some freedom in choosing the dynamic features attached to the dynamic bi-phrases. In the example above, the user has chosen the simple approach of just copying verbatim some of the features associated with the replacement and static-bi-phrase components that produce the dynamic bi-phrase. However, more complex combinations of the features originating in each component may be used.

Because the computed contextual entailment feature $h_{ce}$ requires access to the actual source sentence, it is not possible to "precompile" the (attacked, accuse) bi-phrase, for example, into the static bi-phrase table 32. Additionally, when designing the dynamic features, the user can make use of different existing sources of information, and combine these sources in flexible ways. Here the two sources of information are (i) the static bi-phrase table, and (ii) the entailment module 70. In other cases it may be advantageous to add more sources, or to exploit features coming from several static bi-phrases contributing to the same dynamic bi-phrase.

The exemplary system may be incorporated into an existing phrase based machine translation system, such as the MATRAX™ system developed by Xerox, by incorporation of a dynamic bi-phrase constructor module 62, for generating dynamic bi-phrases and their features and optionally, adapting the development corpus 64. Optionally, an entailment module 70 is incorporated for the specific case of OOV words.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for phrase-based translation comprising:
   receiving an input of source text in a source language to be translated into target text in a target language;
   providing at least one dynamic bi-phrase rule to be used in generation of dynamic bi-phrases for translation of the source text;
   for a sentence of the source text:
      after receiving the source text, applying the at least one rule to the source text to generate a dynamic bi-phrase;
      associating a value of at least one dynamic feature with the at least one dynamic bi-phrase;
      retrieving static bi-phrases from a static bi-phrase table stored in memory which each include at least one word of the source text, each of the static bi-phrases being associated with a value of at least one static feature, each static bi-phrase in the bi-phrase table including a pair of phrases, each phrase comprising a sequence of at least one word, one of the phrases in the pair being from the source language and the other phrase being from the target language, the static bi-phrases having been automatically extracted from a training corpus of bisentences;
      retrieving any of the dynamic bi-phrases which each cover at least one word of the source text, the retrieved static bi-phrases and dynamic bi-phrases forming a set of active bi-phrases;
      generating translation hypotheses for at least a part of the source sentence using active bi-phrases from the set;
      scoring the translation hypotheses with a translation scoring model which takes into account the static feature values of static bi-phrases in the hypothesis and dynamic feature values of dynamic-bi-phrases in the hypothesis, wherein in scoring of a hypothesis, the scoring model considers static bi-phrases in the active set of bi-phrases in which the source phrase of the respective static bi-phrase covers at least one source word of the source sentence, wherein the static bi-phrase and a dynamic bi-phrase in the active set of bi-phrases both cover a same source word, such that each source word of the hypothesis is covered by exactly one of the retrieved bi-phrases in the active set of bi-phrases; and outputting a translation of the source text sentence based on the scoring of the hypotheses;

wherein at least one of the generating at least one dynamic bi-phrase, associating at least one dynamic feature value of a dynamic feature with the at least one dynamic bi-phrase, retrieving static bi-phrases from a static bi-phrase table stored in memory, retrieving any of the dynamic bi-phrases which each cover at least one word of the source text, generating translation hypotheses for at least a part of the source sentence using active bi-phrases from the set, and scoring the translation hypotheses with a translation scoring model is implemented by a computer processor.

2. The method of claim 1, wherein the active static bi-phrases are accorded feature values for the at least one dynamic feature and wherein the at least one active dynamic bi-phrase is accorded a feature value for the at least one static feature.

3. The method of claim 2, wherein the scoring of the translation hypotheses takes into account the active static bi-phrase feature values for the at least one dynamic feature and the at least one active dynamic bi-phrase feature value for the at least one static feature.

4. The method of claim 1, wherein the providing includes providing at least one dynamic bi-phrase generating rule which is configured for generating a dynamic bi-phrase when an instance of a pattern that is able to be instantiated by many possible bi-phrases is observed in a source sentence, the generating of the at least one dynamic bi-phrase including generating a dynamic bi-phrase when one of the instances of the pattern is observed in the source sentence.

5. The method of claim 1, wherein the dynamic bi-phrase generating rule is generated in response to a bi-phrase description input by a user.

6. The method of claim 1, wherein the dynamic bi-phrase is a generic bi-phrase for which instances of the generic bi-phrase are accorded the same dynamic feature values.

7. The method of claim 1, wherein a generic bi-phrase feature value for each of a set of types $T_i$ of dynamic bi-phrase is computed as a function of:

$$\log \frac{count(source_i, target_i)}{count(source_i)}$$

where count($source_i$) is a number of instances of observing the source phrase $source_i$ in a bisentence of the training corpus and count($source_i$, $target_i$) is a number of instances of observing both $source_i$ and the corresponding target phrase $target_i$ in the same bisentence of the training corpus.

8. The method of claim 7, wherein the count($source_i$, $target_i$) is independent of an alignment between the sentences forming the bisentence.

9. The method of claim 1, wherein when the source text includes an out of vocabulary word, the method includes proposing dynamic bi-phrases to a user which are derived from a training corpus of bisentences using textual entailment techniques.

10. The method of claim 9, wherein the at least one feature value for the dynamic bi-phrase is derived from at least one static bi-phrase comprising an entailed source phrase.

11. The method of claim 1, wherein the at least one dynamic feature is accorded a weight which is taken into account by the scoring model.

12. The method of claim 11, wherein the weight is derived from a development corpus which has been adapted to include examples of bi-sentences in which the dynamic bi-phrase occurs.

13. The method of claim 12, wherein when the source phrase is an out of vocabulary word, the weight is derived from the weight for at least one static bi-phrase.

14. The method of claim 1, wherein the generation of the dynamic bi-phrase includes generating a generic bi-phrase rule comprising a source phrase, target phrase pattern which is fired when an instance of the source phrase of the pattern is observed in the input source sentence, the pattern being selected from:

a) a unit conversion pattern where the source phrase includes a variable amount expressed in a first type of units and the target phrase includes a variable amount expressed in a second type of units with an expression for conversion of the value in the first type of units to the value in the second type of units, b) a date conversion pattern where a date in one format is converted to the same date in another format, and c) a numerical expression conversion pattern in which a comma intermediate two digits is replaced with a period between the same two digits.

15. The method of claim 1, wherein each of the static bi-phrases is associated with a value of at least one static feature based on a frequency of the static bi-phrase in the training corpus of bisentences and wherein at least one of the at least one dynamic bi-phrases has no frequency in the training corpus of bisentences on which to base a feature value.

16. The method of claim 1, wherein at least one of the at least one dynamic bi-phrase is based on an output of a rule based machine translation system.

17. The method of claim 1, wherein the at least one dynamic feature value comprises at least two dynamic feature values.

18. The method of claim 1, wherein the translation scoring model is a log linear model of the general form:

$$(t, a)^* = \mathrm{argmax}_{t,a} \exp \Sigma_i \lambda_i h_i(s, a, t) \tag{Eqn. 1}$$

where s is a source text string, t is a target text string, a is an alignment of the source text string and target text string, each $h_i$ is a value of a feature, selected from the static features and the at least one dynamic feature, and each $\lambda_i$ is a weight applied to the respective feature.

19. A system for phrase-based translation comprising memory which stores instructions for performing the method of claim 1 and a processor in communication with the memory for executing the instructions.

20. A non-transitory computer program product comprising a non-transitory recording medium encoding instructions, which when executed on a computer causes the computer to perform the method of claim 1.

21. A system for phrase-based translation comprising:

memory which receives an input of source text in a source language to be translated into target text in a target language;

a static bi-phrase table stored in memory, each of the static bi-phrases in the table being associated with at least one static feature value, each static bi-phrase in the bi-phrase table including a pair of phrases, each phrase comprising a sequence of at least one word, one of the phrases in the pair being from the source language and the other phrase being from the target language, the static bi-phrases having been automatically extracted from a training corpus of bisentences;

a dynamic bi-phrase generator which associates at least one dynamic feature value with at least one dynamic bi-phrase which has been selected for use in translation of the source text into the target language; and a translation scoring model which is input with hypotheses built from an active set of bi-phrases and scores the hypotheses, the active set including a static bi-phrase covering at least one word of the source text and a dynamic bi-phrase covering the same at least one word, whereby the static bi-phrase and dynamic bi-phrase both cover a same source word of the source text, the model taking into account the static feature values of static bi-phrases that each include at least one of the source words in each of the hypotheses and dynamic feature values of any dynamic bi-phrases in each respective hypothesis.

22. The system of claim 21, wherein the dynamic bi-phrase generator computes weights for the dynamic bi-phrases used in the hypotheses.

23. The system of claim 21, wherein the scoring model does not exclude consideration of static bi-phrases which cover at least one source word covered by the dynamic bi-phrase in scoring of the hypotheses.

24. A method for phrase-based translation comprising:
providing a static bi-phrase table, each of the static bi-phrases being associated with a value of at least one static feature based on a frequency of the static bi-phrase in a training corpus of bisentences, each static bi-phrase in the bi-phrase table including a pair of phrases, each phrase comprising a sequence of at least one word, one of the phrases in the pair being from the source language and the other phrase being from the target language;

receiving an input of source text in a source language to be translated into target text in a target language;

after providing the static bi-phrase table, for a sentence of the source text:
applying at least one rule which, when fired, generates at least one respective dynamic bi-phrase based on the source text in the sentence, the rule comprising a source phrase, target phrase pattern which is able to be instantiated by different bi-phrases and which is fired when an instance of the source phrase of the pattern is observed in the input source sentence;

associating a respective value of at least one dynamic feature with the at least one dynamic bi-phrase;

retrieving static bi-phrases from the static bi-phrase table which each cover at least one word of the source text;

combining the retrieved static bi-phrases and any generated dynamic bi-phrases to form a set of active bi-phrases;

when the active set includes a static bi-phrase covering at least one word of the source text and a dynamic bi-phrase covering the same at least one word whereby the static bi-phrase and dynamic bi-phrase both cover a same source word of the source text, generating translation hypotheses in the target language for at least a part of the source sentence using active bi-phrases drawn from the set of active bi-phrases, where each word in the hypothesis is covered by exactly one of the active bi-phrases;

scoring the translation hypotheses with a translation scoring model which takes into account the static feature values of static bi-phrases in the hypothesis and dynamic feature values of dynamic-bi-phrases in the hypothesis; and outputting a translation of the source text sentence in the target language based on the scoring of the hypotheses;

wherein at least one of the applying, associating, retrieving, combining, generating, and scoring is implemented by a computer processor.

25. A non-transitory computer program product comprising a non-transitory recording medium encoding instructions, which when executed on a computer causes the computer to perform the method of claim 24.

* * * * *